July 26, 1960 W. L. LEE 2,946,963

FREQUENCY MULTIPLIER

Filed April 5, 1957

INVENTOR.
WILLIS L. LEE
BY Walter J. Jason
ATTORNEY

United States Patent Office 2,946,963
Patented July 26, 1960

2,946,963

FREQUENCY MULTIPLIER

Willis L. Lee, San Diego, Calif., assignor to General Dynamics Corporation, San Diego, Calif., a corporation of Delaware Filed Apr. 5, 1957, Ser. No. 650,979
4 Claims. (Cl. 331—38)

This invention relates to frequency multipliers and more particularly to a method and apparatus for combining various novel odd and even multiplier circuits to obtain a desired multiple of the input frequency with great suppression of close adjacent hormonics.

Heretofore, frequency multipliers have been made by using resonant circuits in the output of vacuum tubes with the initial frequency impressed on the grid of the tube and the L and C components in the resonant circuit adjusted to obtain the desired frequency. However, great difficulty is encountered in obtaining an unusual multiple, such as 29, 286 or 91, for example. Adjacent frequencies are often quite strong, requiring additional filtering.

The present invention comprises novel frequency multiplier basic circuits, one of which suppresses odd harmonics and another which suppresses even harmonics. By proper selection and utilization of mixer circuits, these multiplier circuits will produce any desired multiple frequency with great suppression of close adjacent harmonics. The closest strong signals are at frequencies spaced far enough from the desired multiple as to not cause confusion or interference.

It is therefore an object of this invention to provide for desired frequency multiplication without strong signals at close adjacent harmonic frequencies.

Another object is the provision of odd and even frequency multiplier circuits in such combination with mixing circuits as to produce any desired frequency multiple with suppressed adjacent harmonics.

Another object is the provision of novel odd and even multiplier circuits.

Another object is the provision of an odd frequency multiplier which suppresses even frequency multiples.

Another object is the provision of an even frequency multiplier which suppresses odd frequency multiples.

Another object is the provision of a frequency multiplier wherein the pulse width of the exciting signal determines the frequency of the output signal.

Another object is the provision of a pulse width control for a frequency multiplier circuit.

Another object is the provision of a frequency multiplier circuit wherein the output frequency is determined by the incoming pulse width and wherein the pulse width is made independent of the pulse amplitude.

Other objects and features of the present invention will be readily apparent to those skilled in the art from the following specification and appended drawings wherein is illustrated a preferred form of the invention, and in which.

Figures 1, 2:
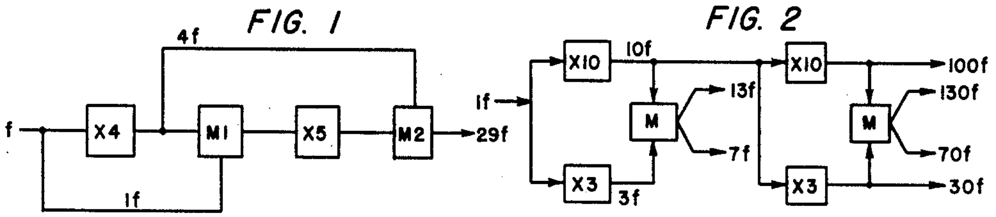
Figure 1 shows an arrangement for obtaining a frequency multiplication of 29.
Figure 2 shows an arrangement for obtaining any desired frequency multiplication.

Referring now to Figure 1, it is desired to produce a frequency multiplication of 29 with suppression of close adjacent harmonics. The squares labeled M denote conventional mixers, the circuitry of which is well known to those skilled in the art. The squares labeled "×4" and "×5" denote the frequency multiplication factor of circuitry represented thereby and to be hereinafter more fully described. The circuitry of ×4 suppresses harmonics of odd frequency and permits an output of strong $4f$ signals, weak harmonics of $2f$ and $6f$, and very weak $8f$ signals, where $f$ is the input frequency. The output of mixer M1 then is $3f$ and $5f$, the heterodyned frequencies of $4f$ and $f$. The circuitry of ×5 suppresses harmonics of even frequency and permits an output of $5f$ signals and weak harmonics of $3f$ and $7f$. The input to mixer M2 from multiplier ×5 then is a strong $25f$ signal (5×5), weak $15f$ (3×5) and $35f$ (7×5) signals. Very weak signals of 3, 5, 7, 9 and $21f$ are present also but these are so weak and spaced so far from the desired frequency that they may be disregarded. All of these frequencies are mixed at M2 with the strong $4f$ signal and weaker $2f$ and $6f$ signals from the ×4 multiplier. In addition to the strong $29f$ signal output, the closest and strongest signals are weak $27f$ and $31f$ signals. Since these may be readily distinguished from the desired strong $29f$ signal, all weaker signals spaced in frequency from the desired frequency may be disregarded. Thus a "clean" signal of 29 times the original frequency has been produced.

By interchanging the ×5 and ×4 multipliers, the same end result of a strong $29f$ signal, with the closest harmonics being a weak $27f$ and $31f$, is achieved. However, suppose an ×4 and an ×7 multiplier was serially connected between the frequency source and a mixer and a $1f$ channel was also connected to the mixer. The mixer output in this case would be a strong $29f$ signal, a very weak $30f$ signal and strong $27f$ and $28f$ signals, the latter two signals being undesirable. These three examples conform to the basic mixing and multiplying principles forming a part of this invention. These are as follows:

(1) The first is to choose multiplicands of the desired frequency, if possible, and multiply in order of magnitude. For example, to get $56f$, an ×2, ×4 and ×7 multiplier would be used in that order. The reason for this is that any harmonics closely spaced in the ×2 and ×4 multipliers are spaced by 7 times in the ×7 multiplier whereas if the ×2 multiplier were used last the spacing would be increased only 2 times.

(2) If the desired frequency is such that mixing is necessary, mix as early in the multiplying chain as possible. Here again close harmonics are spaced by later multiplication.

(3) In mixing, keep the difference between the desired frequency and the mixing frequencies as large as possible, and also (4) Keep the difference between the frequencies being mixed as large as possible. The combination of rules 3 and 4 insures that possible multiples of the frequencies being mixed, in case of mixing leakage, do not come too close to the desired frequency. For example, to get a frequency multiplication of 29 it is preferable to mix $9f$ and $20f$ (if they can be made available) rather than mix $15f$ and $14f$, since any harmonics generated by the mixer would not be close to the desired signal.

Using these principles one can devise very versatile frequency standards as exemplified in Figure 2. Here three basic components, ×10 frequency multipliers, ×3 frequency multipliers and mixers M can be used to obtain frequencies of 1, 3, 7, 10, 13, 30, 70, 100 and 130 times the input frequency. By selecting suitable ones of these frequencies and mixing them, any desired frequency can be achieved.

Figure 3:
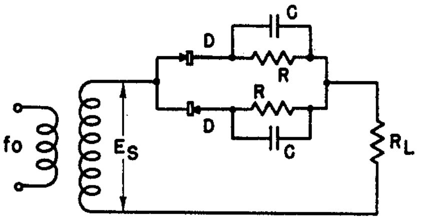
Figure 3 shows a circuit for producing odd multiples of an input frequency.

Figure 3 is a schematic of an odd frequency multiplier. The circuit consists of an input having a voltage $E_S$ at a frequency $f_0$. A diode D in series with a capacitor C bypassed resistor R is in series with the load resistor $R_L$. The diode limits current flow to only one direction. A parallel arrangement of another diode D faced in the opposite direction permits current flow through a second resistance R, capacitor C combination.

Figure 4:
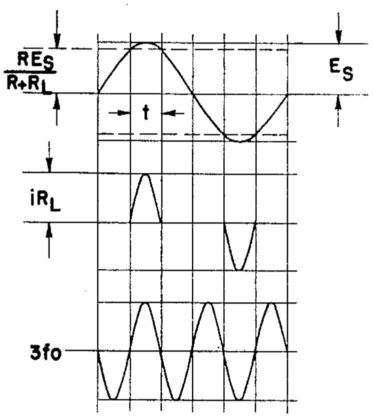
Figure 4 shows the waveforms resulting therefrom.

The top curve in Figure 4 is one complete cycle of the input of $f_0$ frequency. $E_S$ represents the voltage magnitude. The charge on condenser C is equal to $$\frac{E_S R}{R+R_L}$$

Figure 8:
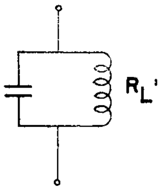
Figure 8 shows a typical resonant tank circuit exemplified by $R_L$ in Figures 3, 5 and 6.

The values are so chosen that the interval of time $t$, which represents the time the $E_S$ voltage is above the $$\frac{E_S R}{R+R_L}$$

value, to be equal to the half cycle time of the new desired frequency of odd multiples of the input frequency. When $R_L$ is a pure resistance, the current flow therethrough during a complete cycle is shown in the second curve in Figure 4. The second pulse is added at a time and with a polarity that makes the production of even harmonics very difficult. It will be noted that the current through $R_L$ flows only during the interval of time $t$ and that these pulses have ideal transfer characteristics for exciting a resonant circuit at the desired frequency. Since the pulse width of these pulses is determined by the fixed ratio and not by the signal level, it is seen that a variation in signal level will not change the harmonic content of the pulse. Therefore the frequency is not a function of signal level. The lower curve illustrates the output if $R_L$ is a resonant tank such as shown as $R_L'$ in Figure 8. In this case the time interval $t$ has been set to multiply the basic frequency three times although multiplications of over 15 times have been made from a basic frequency of 100 k.c. with one such circuit. The load can be any component having a resistance $R_L$, such as a resonant tank, cavity or wave guide when used in microwave multiplying, or the output can be connected to an amplifying element with the resonant circuit used later.

Figure 5:
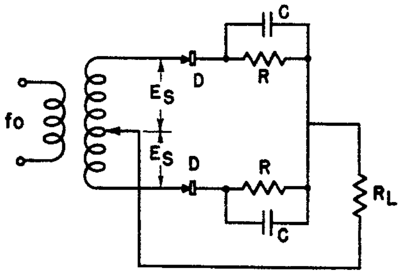
Figure 5 shows one circuit for producing even multiple frequencies.
Figure 6:
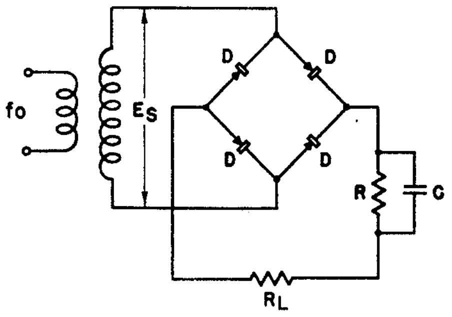
Figure 6 shows another type of circuit for even multiple generation.

Figure 5 and Figure 6 show two types of full wave rectifiers with the addition of R and C units in series with the diodes D. After the first cycle the capacitors C are charged to a value equal to $$\frac{E_S R}{R+R_L}$$

Figure 7:
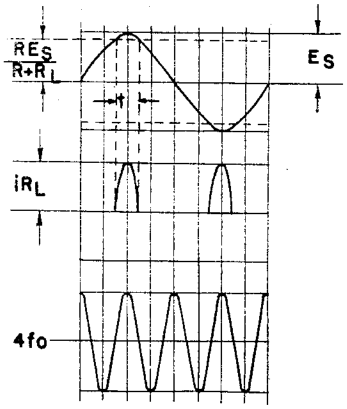
Figure 7 shows the waveforms in connection therewith.

During the following cycles the current will not flow until $E_S$ has reached a value larger than that on the capacitors. There will therefore be two positive pulses as shown in the second curve of Figure 7 when $R_L$ is a pure resistance. The values of R and $R_L$ are so chosen so that the interval of time $t$ which the current flows in each pulse is equal to the half cycle time of the new desired frequency. Since the two positive pulses appear at an inconvenient time for odd harmonic excitation of a resonant circuit, all odd harmonics are suppressed. The lower curve of Figure 7 shows a frequency output of 4 times the input frequency when $R_L$ is a resonant tank. Here again time interval $t$ determines the frequency which may be as high as 16 times the original frequency around the 100 kc. region.

The principal functional difference between the circuits in Figure 3 and in Figure 5 is that in Figure 3 bi-polar pulses are produced and used to energize a resonant circuit for odd multiplication of the input frequency while in Figure 5 uni-polar pulses are produced and used to energize a resonant circuit for even multiplication of the input frequency. In both cases the pulse widths are made equal in time to the half cycle time of the desired frequency. The limiting action of the condenser charge opposing the input voltage except the peaks thereof assure that the pulses produced thereby will aid, and not oppose, the cyclic motion in the resonant circuit.

While certain preferred embodiments of the invention have been specifically disclosed, it is understood that the invention is not limited thereto as many variations will be readily apparent to those skilled in the art and the invention is to be given its broadest possible interpretation within the terms of the fololwing claims:

What I claim is:

1. A frequency multiplier circuit comprising a resonant tank circuit, a pulse generating circuit connected to energize said tank circuit, a reference frequency energy source connected to said pulse generating circuit, said pulse generating circuit energizing said tank circuit with peak voltage pulses generated thereby in response to said reference frequency energy source, said tank circuit being excited with two peak voltage pulses per cycle of said reference frequency, said pulses having a width equal to the half cycle time of the desired frequency multiplication of said reference frequency, said pulse generating circuit having preselected pulse width control means comprising a unidirectional current passing device connected to said energy source and current blocking means connected to said device to block current passage therethrough below a predetermined proportionate amplitude level, said current blocking means comprising an R.-C. network wherein capacitor C is charged by current from said current passing device in an amount approximately equal to $$\frac{E_S R}{R+R_L}$$

where R is the value of the resistance in said R.-C. network, $R_L$ is the impedance of said tank circuit, and $E_S$ is the amplitude of said reference frequency energy.

2. A frequency multiplier circuit for producing odd multiples of the input frequency comprising a resonant tank adapted to oscillate at a predetermined odd multiple, a pulse generating circuit for energizing said tank circuit with pulses twice per input cycle, said pulses occurring at the peaks of cycles of said input frequency, the first pulse being of the same polarity as the first half cycle, the second of said pulses being of the same polarity as the second half cycle.

3. A frequency multiplier circuit comprising a resonant tank circuit, a pulse generating circuit connected to energize said tank circuit, a reference frequency energy source connected to said pulse generating circuit, said pulse generating circuit energizing said tank circuit with peak voltage pulses generated thereby in response to said reference frequency energy source, said pulses having a width indicative of the desired frequency multiplication of said reference frequency, said pulse generating circuit having preselected pulse width control means comprising a unidirectional current passing device connected to said energy source and means connected to said device to block current passage therethrough below a predetermined proportionate amplitude level, said current blocking means comprising an R.-C. network wherein capacitor C is charged by an amount proportional to the amplitude of each signal pulse, said network thereby presenting an opposing current to the next successive signal pulse, said network having an output pulse of duration and amplitude proportional to the difference in amplitude between the charge on said capacitor and the amplitude of said next successive signal pulse.

4. Means for achieving a desired frequency multiple of a first frequency comprising a first frequency multiplier by 10 circuit and a frequency multiplier by 3 circuit connected in parallel to a first frequency source, a mixing circuit connected to the outputs of said circuits to provide an output of 13 and 7 times said first frequency, a second frequency multiplier by 10 circuit and a second frequency multiplier by 3 circuit connected in parallel to said first frequency multiplier by 10 circuit to provide an output of 30 and 100 times said first frequency and a second mixer connected to said second multiplier by 10 and 3 circuits to provide an output of 70 and 130 times said first frequency.

References Cited in the file of this patent

UNITED STATES PATENTS

| | | |
|---|---|---|
| 1,512,941 | Loewe | Oct. 28, 1924 |
| 1,934,574 | Vos | Nov. 7, 1933 |
| 2,303,575 | Nelson | Dec. 1, 1942 |
| 2,423,103 | Koechlin | July 1, 1947 |
| 2,440,465 | Ferguson | Apr. 27, 1948 |
| 2,444,928 | Harrison | July 13, 1948 |
| 2,478,629 | Hiehle | Aug. 9, 1949 |
| 2,666,141 | Clapp et al. | Jan. 12, 1954 |
| 2,748,283 | Merrill et al. | May 29, 1956 |

FOREIGN PATENTS

| | | |
|---|---|---|
| 641,344 | Great Britain | Aug. 9, 1950 |